Aug. 27, 1963 G. W. OAKES 3,101,484
BALL-AND-SEAT VALVES
Filed April 4, 1960

INVENTOR.
GEORGE W. OAKES
BY
ATTORNEY

3,101,484
BALL-AND-SEAT VALVES
George W. Oakes, R.F.D. 1, Byron, Ga.
Filed Apr. 4, 1960, Ser. No. 19,627
3 Claims. (Cl. 4—57)

This invention relates to ball-and-seat valves and more particularly, as disclosed, to balls and means for carrying same in a box-tank such as are used in connection with toilets, though the invention may be used in tanks in general which have an upwardly directed outlet pipe or seat.

One object is to provide a ball and carrier therefor which will permit turning and spinning of the ball about two axes more or less perpendicular to each other, to prevent accumulation of corrosion and to keep the ball and seat well polished for maximum sealing by the valves.

Another object is to provide means which induce the ball to spin or turn to some degree about a generally horizontal axis as the ball becomes seated.

And another object is to provide a ball and carrier therefor which will allow the ball to seat properly, even though the ball is not axially aligned with the seat.

Still another object is to provide a carrier for the ball which will enable wear on the ball to be distributed over a wide area of the ball, at least to a 360° belt the width of the seat.

And still another object is to provide a ball which may be used with the novel carrier as well as with standard existing carriers.

The above objects are attained in a valve mechanism which briefly described, includes a ball and seat member, and carrier means for the ball wherein the ball is mounted for spinning about a generally horizontal axis as well as a more or less vertical axis.

In the accompanying drawing showing, by way of example, two of the many possible embodiments of the invention:

Figure 1:
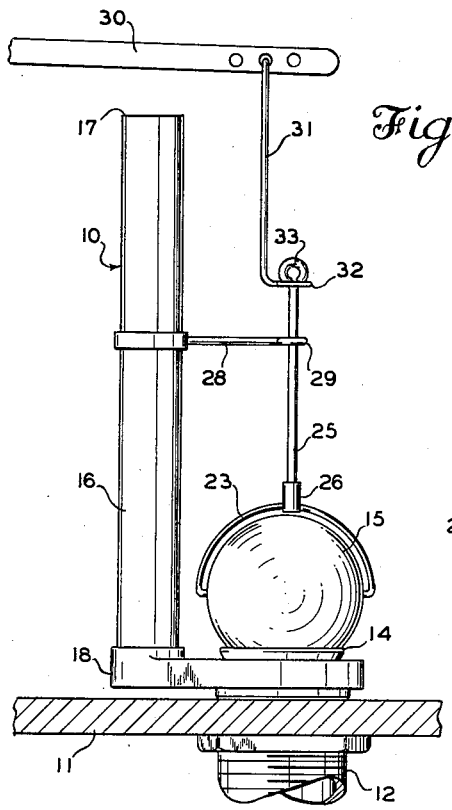
FIG. 1 shows a side elevation of the valve mechanism.
Figure 2:
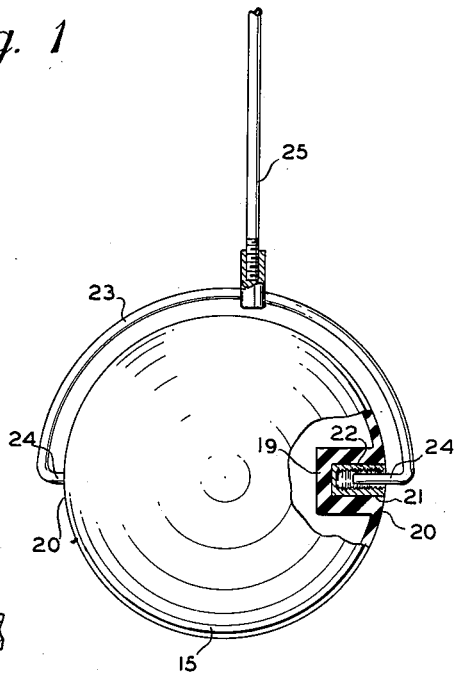
FIG. 2 is a fragmental side elevation showing details of the ball and carrier.

The invention as shown comprises a flush valve mechanism generally designated 10 for use in water closets or toilets, and the like where a large flow of liquid, usually under a low head, is required for a short length of time and a convenient supply of the liquid is not available for such high rates of flow, and yet a supply is available for liquid storage to meet the high-flow demand.

The mechanism 10 is shown as it may be used in a toilet tank-box having a bottom 11 provided with a downflow outlet pipe 12 therethrough. The upper end portion of the pipe is provided with a generally upwardly faced valve seat 14 for receiving a substantially spherical valve ball 15 described in detail below.

The mechanism 10 includes a conventional overflow pipe 16, open at the top 17 and in conventional communication with the outlet pipe 12 below the seat 14, and is mounted by means of a conventional member 18 secured to both pipes and providing said communication.

The ball 15 is preferably of rubber, or other suitable yieldable material well known to the art, hollow, and provided with interior projections 19 at opposite polar zones 20, although in instances where the liquid density, height in the tank, and ball material make it desirable, the ball need not be hollow. This ball requires no tools to install or replace.

The projections 19 are provided with axially aligned recesses 21 snugly receiving bearing means, generally designated 22, whereby a semicircular yoke, or ball member, 23 having substantially aligned inwardly directed trunnion-like end members 24 carries the ball so that the latter may spin about its own axis relative to the yoke. The yoke is provided with a normally somewhat vertical wire-like lift rod 25 substantially fast on the yoke and in the plane thereof and perpendicular to the axis of the ball, but preferably offset from its equatorial plane for reasons given later. A connecting lug 26 fast on the yoke is preferably used for mounting the rod as by threads 27.

The rod 25 is loosely guided in more or less vertical movement by a retaining member 28 on the overflow pipe, which member 28 has an eye 29 through which the rod passes.

The rod 25, yoke 23, and ball 15 are lifted by a lever 30, acting through a link 31 loosely connected to the rod at eyes 32 and 33 in a well known manner so that the rod may spin in the eye 32 of the link.

The described construction enables the ball to spin about its horizontal axis and to gyrate or wobble about a more or less vertical axis. By this construction, it will be seen that, though the ball is not axially aligned with the seat, when the ball drops it can spin about its horizontal axis a sufficient amount to roll into the seat; and, if required, the ball may spin about the rod 25. This combination of movements will allow the ball to seat perfectly, no matter from which direction the ball approaches the seat.

Also, this rolling and spinning will keep the valve seat polished to prevent accumulation of corrosion which may preclude proper seating. Due to the eccentric vertical axis on which the ball is mounted, it is improbable that the ball will seat exactly by a simple downward motion; hence, there will usually be some degree of spinning or wobbling of the ball. The assurance of this spinning or wobbling assures that the valve seat will always be polished to provide a maximum degree of sealing.

In addition to the polishing action of the above described motions, it will be seen that, since the ball is rotated about both horizontal and vertical axes, the wear will be evenly distributed throughout a large area of the surface of the ball. This will preclude poor sealing due to the excessive wearing in certain areas of the ball, and provide a very long, useful life of the ball.

Figure 3:
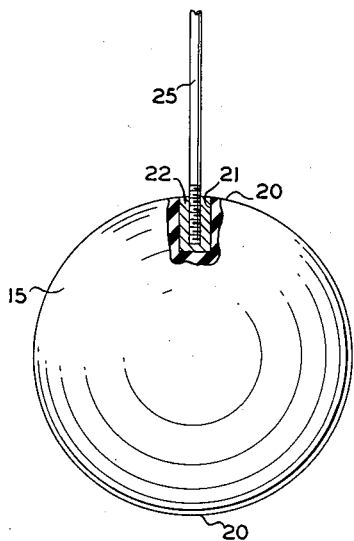
FIG. 3 shows the ball member of the invention installed on the conventional valve carrying means.

In the event that the valve system is not provided with the yoke 23, the ball 15 may be mounted on conventional valve systems, as seen in FIG. 3. The bearing member 22 is provided with internal threads which, it is contemplated, match the standard threads on rod 25. Thus, the ball 15 may be mounted in a conventional manner by screwing one of the bearing portions 22 on the rod 25, as is conventional in such systems. When so used, the spherical ball will seat properly with a relatively large tolerance in the axial alignment of valve seat 14 and ball 15. Due to the spherical shape of the valve member 15, it will be seen that the rod 25 need not be exactly vertical, but may be canted in any direction, so long as the axis of the valve seat passes through the center of the ball.

Also, when used in a conventional system as in FIG. 3, the ball 15 has a double life. When the ball becomes worn to such an extent that it will no longer seat properly, it may be unscrewed from rod 25, rotated 180° about its horizontal axis, and screwed back, with rod 25 in the diametrically opposed bearing member, thus to use the other hemisphere of the ball as the sealing portion. This gives the ball a useful life twice as long as that of conventional sealing members.

Thus, it will be seen that the present invention provides a valve member which will always seat properly and will have an especially long, useful life. It will be readily understood by those skilled in the art that the invention is not limited to the embodiment chosen for purpose of illustration, but many changes and modificatiosn may be made,

The invention claimed is:

1. A flush valve comprising a valve-seat member having an upwardly directed face; a substantially spherical ball for disposition on the seat member, the ball being provided with axially aligned bearings at opposite poles; a substantially semicircular yoke piece having inwardly directed end members in said bearings for mounting the ball for free rotation about its own axis within the yoke piece; a lift rod free to rotate and wobble about a generally vertical axis and mounted fast on the yoke piece and in the general plane thereof, and perpendicular to the ball axis, and slightly offset from the equatorial plane of the ball, so as to tend to induce the ball to turn on its own axis upon initial contact of the face and ball when the latter is lowered.

2. A flush valve system for a water closet tank comprising a down-flow outlet pipe member having a horizontal seat and vertical axis; a spherical ball for said seat; a semicircular yoke piece embracing part of the ball and having aligned inwardly directed end portions; bearing means on said end portions for mounting the ball for free rotation on its own axis; a lift rod fast on the yoke and remote from the equatorial plane of the ball and perpendicular to the horizontal axis thereof, and guide means for loosely holding the lift rod generally erect.

3. A flush valve of the type adapted for seating on a valve seat member having an upwardly directed face, said flush valve comprising a substantially spherical ball for disposition on said valve seat member, a substantially semicircular yoke piece supporting said ball for free rotation about its axis within said yoke piece, and a lift rod free to rotate about a generally vertical axis, said lift valve being mounted fast on said yoke piece essentially perpendicular to said axis of said ball, said lift rod being slightly offset from the equatorial plane of said ball so as to tend to induce said ball to turn on its own axis upon initial contact of said face and said ball when the latter is lowered.

References Cited in the file of this patent

UNITED STATES PATENTS

| | | |
|---|---|---|
| 926,239 | Canfield | June 29, 1909 |
| 966,720 | Tilden | Aug. 9, 1910 |
| 1,286,791 | Saal | Dec. 3, 1918 |
| 1,668,803 | Cigol et al. | May 8, 1928 |
| 1,744,491 | Mullen | Jan. 21, 1930 |
| 2,892,197 | Flieder | June 30, 1959 |
| 2,897,513 | Rosenberg | Aug. 4, 1959 |
| 3,056,141 | Ecoff | Oct. 2, 1962 |